United States Patent
Sawicki et al.

(10) Patent No.: US 10,185,102 B2
(45) Date of Patent: Jan. 22, 2019

(54) OPTICAL FIBER CONNECTOR WITH INTEGRATED INSTALLATION TOOLS

(71) Applicant: Corning Research & Development Corporation, Corning, NY (US)

(72) Inventors: Joseph C. Sawicki, Austin, TX (US); Donald K. Larson, Cedar Park, TX (US); Michael May, Austin, TX (US); Takaya Yamauchi, Sagamihara (JP)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 15/785,626

(22) Filed: Oct. 17, 2017

(65) Prior Publication Data

US 2018/0128996 A1 May 10, 2018

Related U.S. Application Data

(60) Provisional application No. 62/418,320, filed on Nov. 7, 2016.

(51) Int. Cl.
*G02B 6/38* (2006.01)

(52) U.S. Cl.
CPC ......... *G02B 6/3898* (2013.01); *G02B 6/3846* (2013.01); *G02B 6/3849* (2013.01); *G02B 6/3887* (2013.01); *G02B 6/3893* (2013.01)

(58) Field of Classification Search
CPC .. G02B 6/3898; G02B 6/3887; G02B 6/3893; G02B 6/3846; G02B 6/3849
See application file for complete search history.

(56) References Cited

U.S. PATENT DOCUMENTS

| 4,824,197 A | 4/1989 | Patterson |
| 5,102,212 A | 4/1992 | Patterson |
| 5,138,681 A | 8/1992 | Larson et al. |
| 5,155,787 A | 10/1992 | Carpenter et al. |

(Continued)

FOREIGN PATENT DOCUMENTS

| EP | 2 592 452 A1 | 5/2013 |
| EP | 2 624 032 A1 | 8/2013 |

(Continued)

OTHER PUBLICATIONS

International Search Report for Appl. No. PCT/IB2017/056443, dated Jan. 4, 2018, 6 pp.

*Primary Examiner* — Ryan A Lepisto
(74) *Attorney, Agent, or Firm* — Michael E. Carroll, Jr.

(57) ABSTRACT

An optical connector having at least one removable integrated assembly tool for terminating an optical fiber cable is described. The connector comprises a housing configured to mate with a receptacle, a collar body disposed in the housing, a backbone that retains the collar body in the housing, a removable funnel-shaped and a fiber boot. The collar body secures a ferrule secured at a first end thereof, and includes mechanical element disposed in an intermediate portion and a buffer clamping portion near a second end of the collar body. The backbone has a mounting structure surrounding a central bore at one end. The funnel-shaped fiber guide attaches to the mounting structure to facilitate insertion of an optical fiber into the connector, and wherein the fiber boot is attachable to the mounting structure after the fiber guide has been removed.

20 Claims, 11 Drawing Sheets

(56) References Cited

U.S. PATENT DOCUMENTS

| | | |
|---|---|---|
| 5,159,653 A | 10/1992 | Carpenter et al. |
| 7,280,733 B2 * | 10/2007 | Larson ................. G02B 6/3801 385/134 |
| 7,369,738 B2 | 5/2008 | Larson et al. |
| 7,775,726 B2 | 8/2010 | Pepin et al. |
| 8,070,367 B2 | 12/2011 | Winberg et al. |
| 8,167,504 B2 * | 5/2012 | Allen ................... G02B 6/4475 385/100 |
| 8,573,859 B2 | 11/2013 | Larson et al. |
| 8,876,405 B2 | 11/2014 | Larson et al. |
| 9,389,370 B2 | 7/2016 | Pratt et al. |
| 2008/0247710 A1 | 10/2008 | Oike et al. |
| 2012/0189260 A1 | 7/2012 | Kowalczyk et al. |
| 2018/0081130 A1 | 3/2018 | Sawicki et al. |

FOREIGN PATENT DOCUMENTS

| | | |
|---|---|---|
| JP | 2015-025973 | 2/2015 |
| WO | WO 2015-031704 | 3/2015 |

\* cited by examiner

OPTICAL FIBER CONNECTOR WITH INTEGRATED INSTALLATION TOOLS

BACKGROUND OF THE INVENTION

Field of the Invention

The present invention is directed to installation tools that can be integrated with an optical fiber connector in the factory to facilitate field installation of the connector.

Background

In the area of optical telecommunication networks, fiber optic connectors are one of the primary ways to connect two or more optical fibers. There are several classes of optical fiber connectors including adhesive ferruled connectors, in which the fiber tip is held in a substantially fixed position relative to the end face of the ferrule by adhesively securing the fiber within the bore of the ferrule. A second class of connectors includes remote grip (ferruled) connectors, where the fiber is secured at some distance away from the terminal end or tip of the fiber. Each of these styles of connectors typically require some degree of finishing work be done in the field (e.g. polishing of the fiber tip) in order to achieve optimal performance.

An alternative to these connectors is the use of a mechanical connector with a fiber stub. The fiber stub can be polished in the factory eliminating the need for field polishing the fiber. When installing a mechanical connector with a fiber stub, the field technician will use a fiber cleaver to get a clean, cleaved surface on the end of the optical fiber and an installation tool to aid in insertion of the optical fiber into the connector and with the actuation of the mechanical element within the connector.

Recently, efforts have been made to simplify the installation procedures and tools used to field install optical fiber connectors. Still, different tools are often required for each different connector type (e.g. SC vs. LC or spliced vs. splice-less mechanical connectors, etc.) or for the same type of connectors offered by different vendors. This variability can lead to installation mistakes by the craft which can result in breaking of the optical fiber during installation, or reduced reliability and/or signal performance after installation. As a result, service and network providers as well as their contractors would like to reduce the number of tools required and simplify the installation process of field-mount connectors. In addition, reduction in the number of tools would improve the craft's efficiency and reduce installation errors due to selection of an improper tool.

Thus, there is a need for an optical fiber connector installation process requiring fewer tools.

SUMMARY

The present invention is directed to an optical connector having at least one removable integrated assembly tool for terminating an optical fiber cable. The connector comprises a housing configured to mate with a receptacle, a collar body, a backbone, a removable funnel-shaped fiber guide and a fiber boot. The collar body is disposed in the housing and includes a ferrule secured at a first end of the collar body, a mechanical element disposed in an intermediate portion of the collar body, and a buffer clamping portion near a second end of the collar body, wherein the buffer clamping portion is configured to clamp at least a portion of a buffer cladding of the optical fiber upon actuation. The backbone retains the collar body within the housing, and includes a mounting structure surrounding a central bore at one end of the backbone. The removable funnel-shaped fiber guide is attached to the mounting structure to facilitate insertion of an optical fiber into the connector, and the fiber boot is attachable to the mounting structure after the funnel-shaped fiber guide has been removed.

In another aspect, the present invention is directed to a removable funnel-shaped fiber guide that can be temporarily attached to an optical fiber connector to facilitate insertion of an optical fiber into the connector. The funnel-shaped fiber guide comprises a connection portion to removably connect and align the funnel-shaped fiber guide to the optical fiber connector and a funnel portion to facilitate insertion of the optical fiber into the collar body of the connector, wherein the funnel portion of the funnel-shaped fiber guide includes a channel extending from a narrow end adjacent the connection portion to a wide end spaced away from the connection portion.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "forward," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The first step in terminating an optical fiber cable with an optical fiber connector involves stripping or removing the outer layers of the cable to expose the glass portion of the optical fiber (i.e. the core and cladding of the fiber). The exposed glass portion is then cleaved to a desired length depending on the type of optical fiber connector being used. Cleaving provides an end face that can be nearly perpendicular to the axis of the fiber and reduces the amount of polishing required. In some applications, an angle cleave (e.g. of less than about 10°) can be used to improve the performance of the optical fiber connector. Next, the bare glass portion of the optical fiber cable is threaded into the back end of the optical fiber connector. This insertion of the optical fiber into the connector can be difficult to do in the field, especially when working with LC or other small format connector styles. To make this easier for the technician, a variety of installation tools are now available such as the fiber termination platform described in U.S. Pat. No. 7,280,733 and U.S. patent application Ser. No. 15/708,846.

Exemplary optical fiber cables usable with the current invention can include optical fiber cable having a standard cylindrical shape, a rectangular shape, an oval shape cable, or an elliptical shape. In an exemplary aspect, the optical fiber cable is a standard optical fiber cable having a 900 μm diameter buffer layer and a cable jacket having an outer diameter ranging from about 1.5 mm to about 3 mm. Exemplary cables are available from Corning Inc., Rosenberger Technology Company, Prysmian Group and others. Of course, in alternative aspects, the connector can be adapted to accommodate fiber cables of different dimensions, as would be apparent to one of skill in the art, given the present description.

As mentioned previously, the telecommunication service providers as well as their contractors are looking for simpler, easier to use installation tooling or looking for solutions which minimize the craftsman's reliance on separate installation tooling.

Figure 1A:
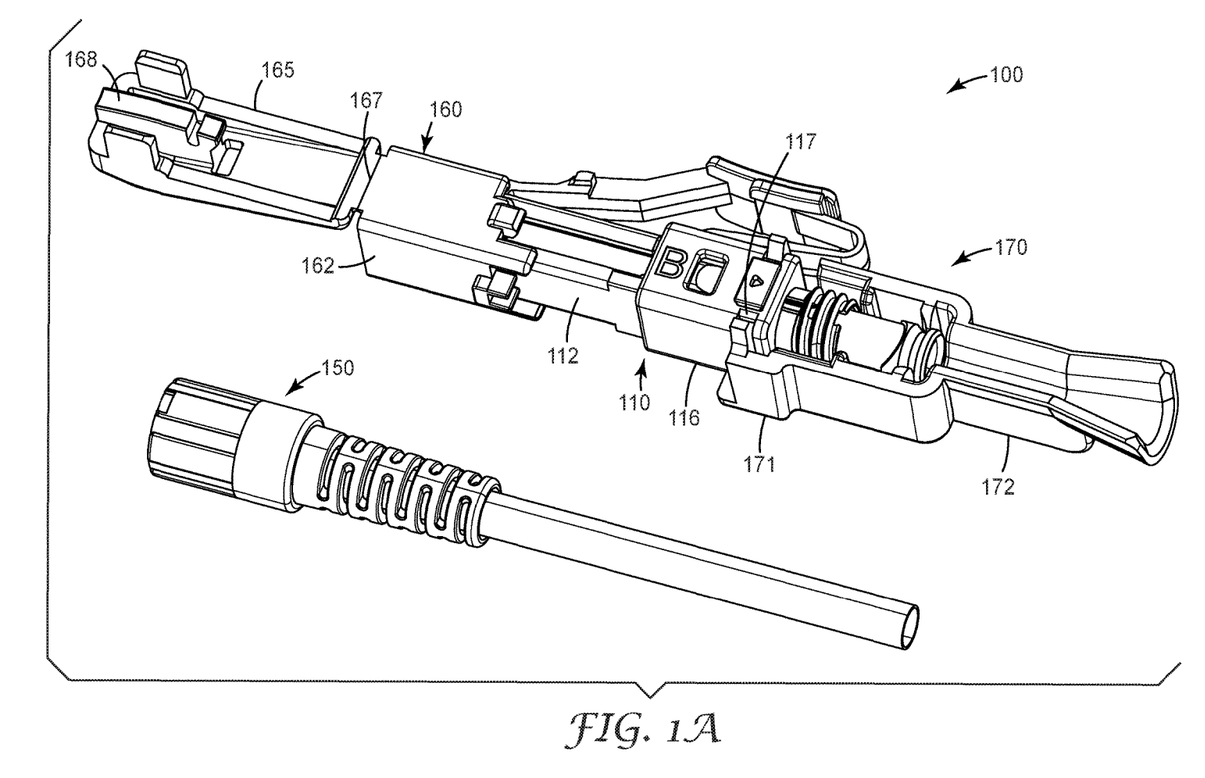
FIGS. 1A-1C are three views of an optical fiber connector with integrated assembly tools according to an embodiment of the present invention.
Figure 1B:
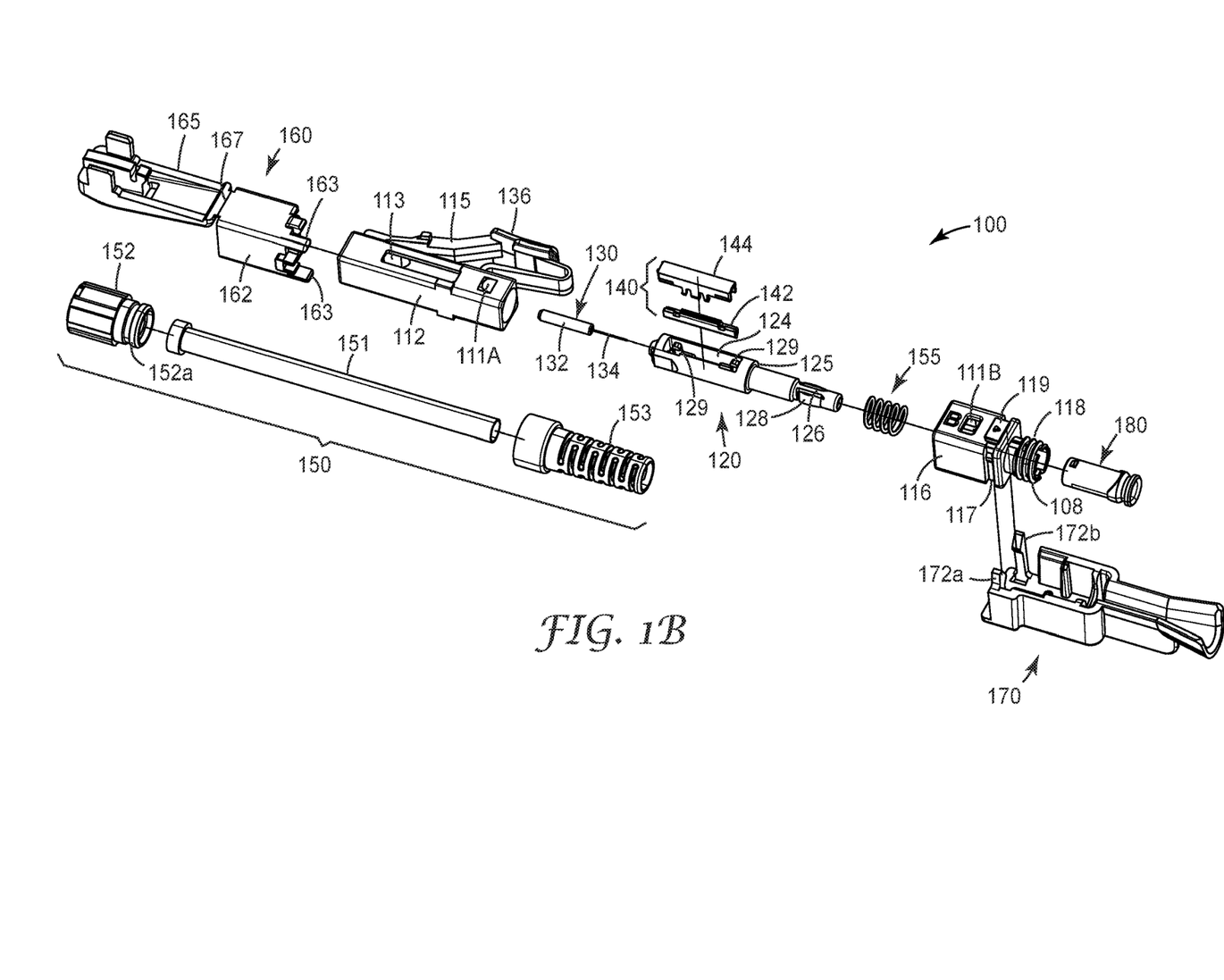
Figure 1C:
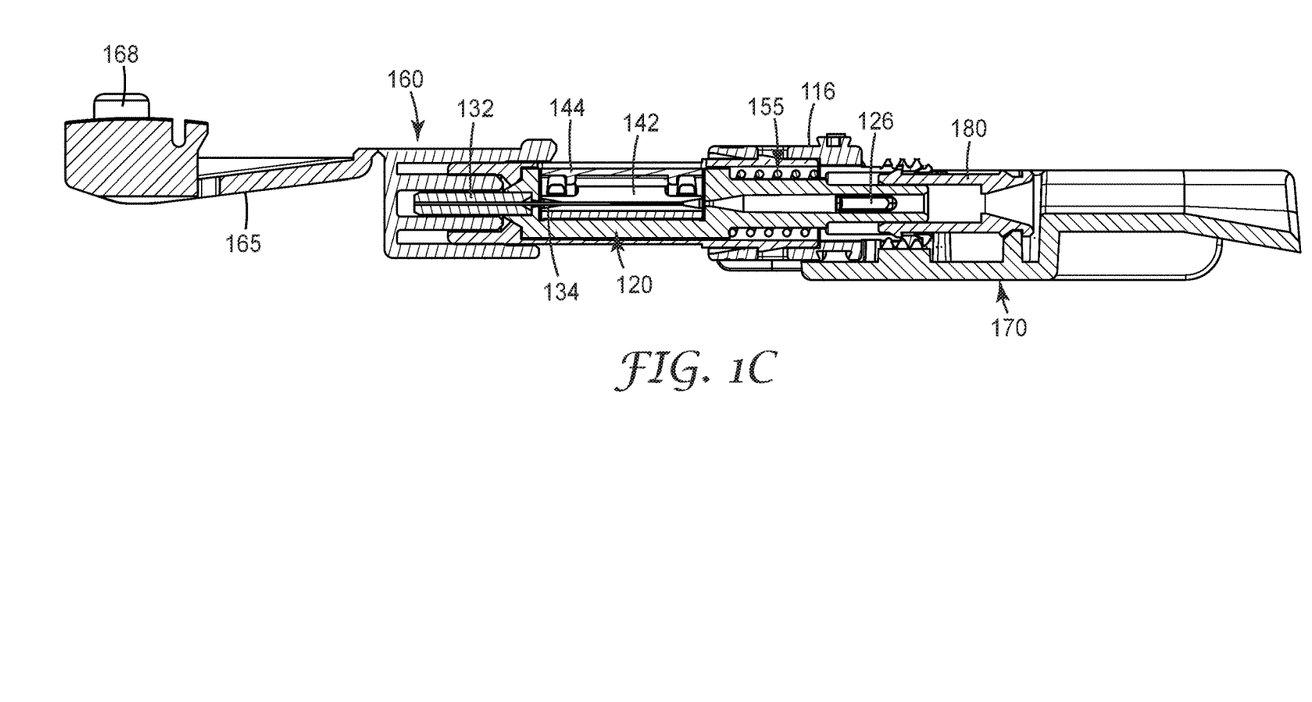

One way of reducing the craft's reliance on installation tooling is to integrate the tooling into the optical fiber connector. FIGS. 1A-1C show a mechanical optical fiber connector 100 with integrated, removable assembly tools, such as a dust cap actuator tool 160 and a funnel-shaped fiber guide 170. Specifically, optical fiber connector 100 is an LC format optical fiber connector that is used to terminate jacketed optical fiber drop cables.

Optical fiber connector 100 is configured to mate with an LC receptacle. LC-type optical fiber connector 100 can include a connector body having a housing 110 and a fiber boot 150. In this exemplary embodiment, housing 110 includes an outer shell 112, having a front face that is configured to be received in an LC receptacle (e.g., an LC coupling, an LC adapter, or an LC socket), and a backbone 116 that provides further structural support and closes off the end of the connector to contain the ferrule 132, collar body 120, and spring 155 of the connector.

Housing 110 also includes an opening 113 formed on a side of the shell 112 of sufficient size to allow for access to a mechanical element 140 disposed therein (see further to discussion below). Also, in one aspect, one or more access slots (not shown) can be provided in shell 112 opposite opening 113 to allow access to the mechanical splice from the opposite side.

Outer shell 112 has an outer LC-shaped body format. A latch 115 is formed on the outer shell 112 structure. In an exemplary aspect, latch 115 is a single contiguous latch. In particular, the latch 115 is connected to the outer shell 112 at both the front end (i.e. near the ferrule tip) and rear end (near the backbone 116). The latch 115 further includes a driver surface 136, preferably formed as a large pad disposed near the rear end of the outer shell 112, that can be easily contacted by a user's thumb or other finger to depress the latch for removal of the connector 100 from a receptacle (e.g., an LC adapter/coupling (not shown)).

Backbone 116 includes a slot (not shown) that allows the backbone 116 to be slid over the rear portion of the outer shell 112 and that accommodates the latch 115. The backbone 116 can include a robust mounting structure 118 disposed on a rear portion of the backbone that provides for coupling to a crimp ring, a fastener, or a fiber boot 150, which can be utilized to protect the optical fiber from bend related stress losses. Fiber boot 150 is coupled to the mounting structure 118 disposed on the rear portion of the backbone 116. In an exemplary aspect, backbone 116 can be fastened to outer shell 112 via a snap fit mechanism 111A, 111B.

Backbone 116 can further include a channel 117 disposed on each side of the backbone near mounting structure 118 to allow attachment of funnel-shaped fiber guide 170. In particular, catch arms 171 at the first end of the funnel-shaped fiber guide can be accommodated within these channels to align and secure the funnel-shaped fiber guide to the second end of the connector body.

In the alternative aspect shown in FIGS. 1A-1C, backbone 116 can include a coupling mechanism to couple connector 100 to another connector in a duplex or other multi-connector format. In a preferred aspect, the coupling mechanism comprises a dovetail protrusion 119 formed on a first side surface of the backbone 116 and a corresponding slot (not shown) formed on an opposite side surface of backbone 116. The slot is configured to slidingly and snugly engage with the dovetail portion 119 of an adjacent connector. In addition, for convenience of use in the field, the backbone 116 can include cable identification labels formed on opposite outer sides, such as an "A" on one side and a "B" on the other side (or a "1" and a "2", etc.).

Connector 100 further includes a collar body 120 that is disposed within the connector housing and retained therein. According to exemplary embodiments, the collar body 120 is a multi-purpose component that can house a fiber stub assembly 130, a mechanical element 140, and a fiber buffer clamping portion 126. Collar body 120 includes a first end portion having an opening to receive and house a fiber stub assembly, which includes a ferrule 132 having an optical fiber 134 adhesively secured therein. Ferrule 132 can be formed from a ceramic, glass, plastic, or metal material to support at least a portion of the optical fiber 134. The fiber stub can comprise a standard multimode optical fiber or single mode optical fiber, such as SMF 28 (available from Corning Inc.). Fiber stub 134 is positioned in ferrule 132 so that a first end of the fiber stub is flush with the end face of the ferrule and a second end of the fiber 134 extends beyond the end of the ferrule so that it will extend part-way into the interior of the connector 100. The second end of the fiber stub can be spliced to a second optical fiber, such as field fiber 14 (see FIG. 3A).

Collar body 120 is configured to have some limited axial movement within housing 110. For example, the collar body 120 can include a collar or shoulder 125 that provides a seating surface for spring 155, interposed between the collar body and an inside surface of backbone 116. In an exemplary aspect, collar body 120 can be formed or molded from a polymer material, although metal and other suitable materials can also be utilized, as is described above. The collar body 120 is secured within housing 110 by backbone portion 116, in a manner similar to that described above.

Collar body 120 further accommodates a mechanical element 140 comprising a mechanical splice device, having a splice element 142 and an element cap 144. Splice element 142 is formed from a sheet of ductile material having a focus hinge that couples two legs about a fiber axis, where each of the legs includes a fiber gripping channel (e.g., a V-type or similar groove) to optimize clamping forces for conventional glass optical fibers received therein. The ductile material, for example, can be aluminum or anodized aluminum. In one aspect, a conventional index matching fluid can be preloaded into the V-groove region of the splice element for improved optical connectivity within the splice element. In another aspect, no index matching fluid is utilized. The splice element is mountable in a cradle 124 integrally formed in collar body 120. Cradle 124 can secure (through e.g., snug or snap-fit) the axial and lateral position of the mechanical element 140, for example, one or more retainer elements 129.

In an exemplary embodiment, in operation, as the cap 144 is moved from an open position to a closed position, one or more cam bars located on an interior portion of the cap 144 can slide over splice element legs, urging them toward one another. Two fiber ends, (e.g., one end of fiber stub 134 and one end of the field fiber 14) are held in place in grooves formed in the splice element and butted against each other and are spliced together in a channel to provide sufficient optical connection, as the element legs are moved toward one another. Similar, albeit larger, splice elements are described in U.S. Pat. No. 5,159,653, incorporated herein by reference in its entirety. Other conventional mechanical splice devices can also be utilized in accordance with alternative aspects of the present invention and are described in U.S. Pat. Nos. 4,824,197; 5,102,212; 5,138,681; and 5,155,787, each of which is incorporated by reference herein, in their entirety.

Further, collar body 120 includes a buffer clamping portion 126 that can be configured to clamp the buffer portion 13 of the field fiber 14 being spliced. In an exemplary aspect, the buffer clamping portion 126 is disposed within the interior of the backbone 116 in the fully assembled connector. In a preferred aspect, buffer clamping portion 126 is an integral part of the connector structure. The buffer clamping portion 126 can include one or more longitudinally formed slots, resulting in a collet-like shape. This configuration creates clamping fingers 128 to depress and engage the buffer portion of a field fiber when a sleeve 180 is slidingly fitted over buffer clamping portion 126 by moving sleeve 180 on an axial direction towards the connector housing. Other alternative buffer clamps structures can also be utilized, such as described in U.S. Pat. No. 7,280,733, incorporated by reference herein.

In an exemplary aspect, sleeve 180 is pushed over the buffer clamping portion 126 when boot 150 is attached to the mounting structure 118 of the backbone 116. In one aspect, mounting structure 118 comprises a plurality of outer threads 108 disposed on an outer surface thereof to be received within corresponding inner threads 154 (FIG. 4B) of boot 150.

Boot 150 can prevent sharp fiber bends at the connector/fiber interface. Boot 150 includes a rotatable nut portion 152, a tail section 153, and an optional tubular portion 151. In one aspect, the nut portion 152 and tail section 153 can be provided as separate elements where the tail section 153 is simply inserted through the back end of the nut portion 152. In an alternative aspect, the nut portion can include a lip 152a such that the tail portion can be pushed over the lip to secure the tail portion to the nut portion. The tail section 153 can have a slightly tapered outer diameter and an internal bore extending therethrough that is configured to accommodate the outer diameter of a standard fiber cable or the optional tubular portion. In another aspect, the nut portion 152 and tail section 153 are provided as a single integrated element. The nut portion 152 has a threaded interior surface 154 configured to engage with corresponding outer threads 108 from mounting section 118. The tail section 153 has some flexibility sufficient to provide the fiber minimum bend radius to prevent possible signal losses when the fiber is side-loaded. Nut portion 152 and tail section 153 can be formed from different materials or, alternatively, these elements can be formed of the same material. For example, the tail section 153 can be formed from a material that is more flexible than the material forming the nut portion 152. If a two part design is utilized, the tail section 153 can be snap fit into back end of the nut portion 152 in the factory or in the field.

In some instances, the tubular portion 151 is used when the length of cable jacket that is removed is greater than the length of the tail section. The tubular portion will extend over any exposed buffer layer and partway over the cable jacket adjacent to the exposed buffer layer to provide an added layer of protection to the exposed buffer layer. In some aspects, the exposed buffer layer after stripping can have an optimized segment length of about 30 mm to about 50 mm, to control the force on the fiber end face during installation. The exposed length of the buffer layer may extend beyond the end of the tail portion 153 of boot 150 in some instances, and tubular portion 151 can be used to cover and protect the exposed buffer layer. In addition, the cable jacket may shrink away from the connector after installation onto the terminal end of a fiber optic cable as a result of environmental conditions. The tubular portion should be long enough to cover and protect the exposed buffer layer for all conditions.

Dust cap actuator tool 160 comprises a body portion 162 that covers the end face of the connector ferrule 132 to protect the end of the fiber stub from damage and debris and a cap actuator or driver 165 can be configured as a lever or a rotating button. In the present embodiment, a rotating button is shown. The rotating button has a contact surface that is large enough to enable finger actuation of the mechanical element. When the rotating button is pressed, it contacts and transmits sufficient force to the element cap of the connector, such as element cap 144 of the mechanical element 140 (described further below) to actuate the splice element within the connector. Cap actuator 165 can be connected to body portion 162 by a living hinge 167 to allow the cap actuator to be moved from a first position (shown in FIG. 1A) to a second position (shown in FIG. 3C) to actuate the mechanical splice in the optical fiber connector.

In this exemplary aspect, a small chamber (not shown) is formed in the end body portion 162 and has an inner diameter slightly larger than the outer diameter of the ferrule 132. In this manner, the end cap can be placed onto the front end of the connector housing 110 (see FIG. 1A) and protect the ferrule from dust or other contaminants. The dust cap actuator tool 160 also includes a second portion having protruding or extending pin structures 163 that can be used to displace the element cap 144 of the splice device when needed for fiber repositioning or removal within splice element 142, as explained further below.

In an exemplary aspect, funnel-shaped fiber guide 170 is a removable installation which is integrated with or removably attached to housing 110 of optical fiber connector 100 in the factory. Providing the optical fiber connector with a dust cap actuator tool 160 and the funnel-shaped fiber guide 170 eliminates the need for a separate assembly platform used with conventional mechanical connectors.

Figure 2A:
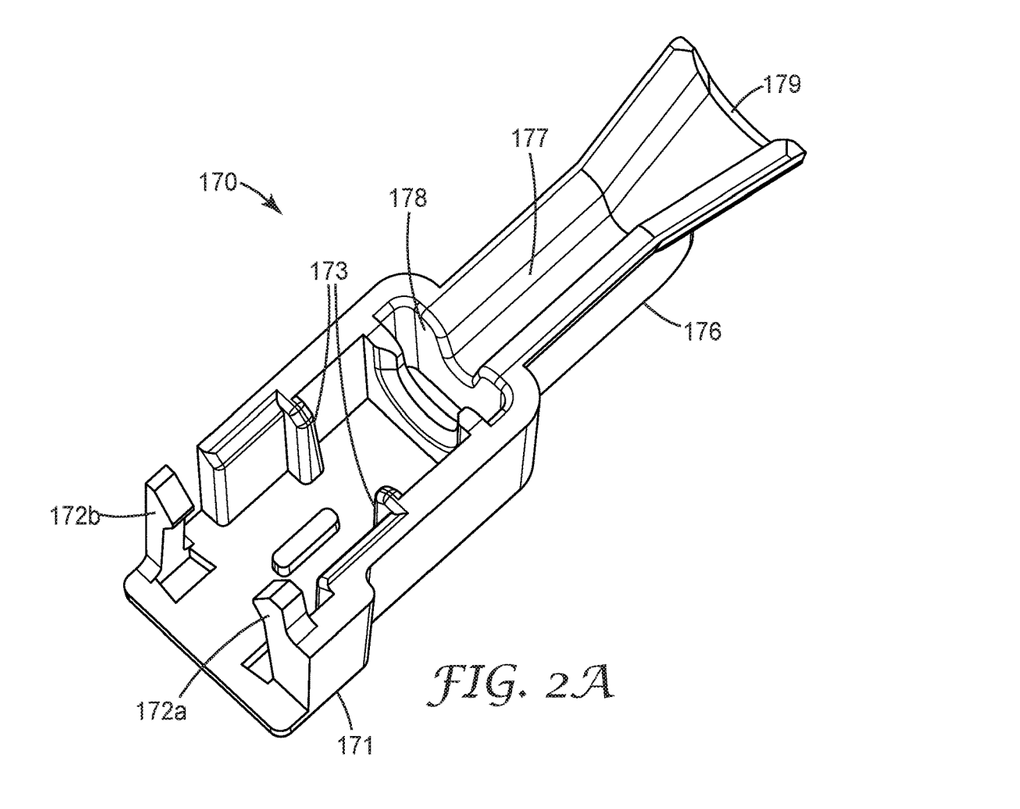
FIGS. 2A and 2B are two detail views of a funnel-shaped fiber guide usable with the optical fiber connector of FIGS. 1A-1C.
Figure 2B:
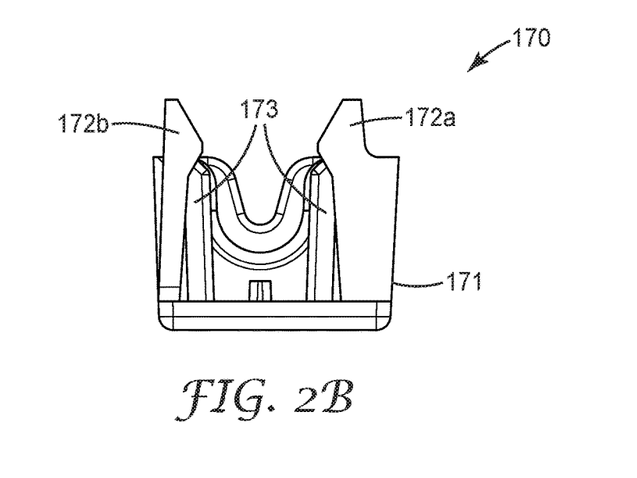

Referring to FIGS. 1A, 2A and 2B, funnel-shaped fiber guide 170 includes a connection portion 171 that enables the fiber guide to be removably connected to the backbone 116 of optical fiber connector 100 as shown in FIG. 1A and a funnel portion 176 to facilitate insertion of the optical fiber into the collar body of the connector.

The connection portion 171 comprises a box like cradle that can partially surround and hold the second end of an optical fiber connector such as optical fiber connector 100 and a pair of catch arms 172 to retain the second end of the connector in the connection portion. The pair of catch arms comprises a stationary catch arm 172a and a flexible catch arm 172b. The catch arms engage with channels 117 disposed on each side of the backbone 116 near mounting structure 118 of optical fiber connector 100 enabling the attachment of funnel-shaped fiber guide 170 to the optical fiber connector. In particular, catch arms 172 align and secure the funnel-shaped fiber guide to the second end of the connector body when engaged. After the optical fiber has been secured in the optical fiber connector, the funnel-shaped fiber guide can be removed from the connector by applying a removal force as indicated by directional arrow 199 in FIG. 3C causing the flexible catch arm to move allowing the removal of the funnel-shaped fiber guide.

The connection portion can also include optional alignment walls 173 which can help in maintaining the proper alignment of the funnel portion 176 of the funnel-shaped fiber guide 170 with the second end of the optical fiber connector.

The funnel portion 176 of the funnel-shaped fiber guide 170 includes a channel 177 extending from a first or narrow end 178 adjacent the connection portion to a second or wide end 179 spaced away from the connection portion. The channel is tapered between the wide end and the narrow end. The funnel portion facilitates insertion of the bare glass portion of the optical fiber into the second end of the connector while the connection portion ensures alignment of the narrow end of the funnel portion with the second end of the connector.

While the preceding description has been described with respect to a splice type connector (i.e. having a fiber stub), the integrated fiber tools can also be used with a remote grip style mechanical connector not having a fiber stub. The terminated fiber cable can comprise a standard multimode optical fiber or single mode optical fiber, such as SMF 28 (available from Corning Inc.).

Figure 3A:
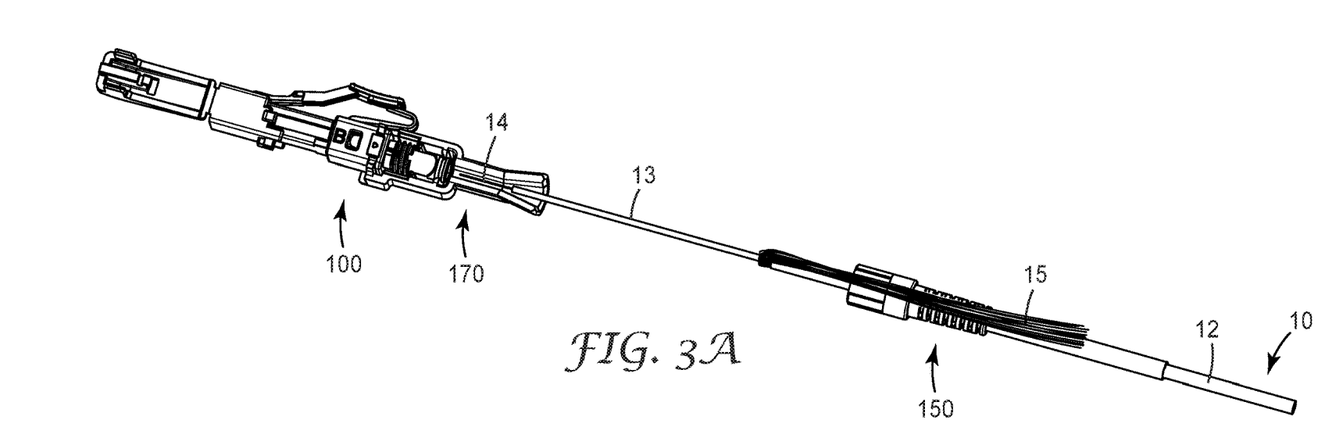
FIGS. 3A-3E illustrates the installation process for the optical fiber connector of FIGS. 1A-1C on the terminal end of an optical fiber cable.

FIGS. 3A-3E illustrate the termination process of optical fiber connector 100 with integrated installation tools on a terminal end of an optical fiber cable 10. Before beginning the preparation of the terminal end of the optical fiber cable, fiber boot 150 can be threaded onto optical fiber cable 10. The cable jacket 12 can now be stripped off and the strength members 15 folded back out of the way as shown in FIG. 3A. Next, the buffer layer 13 is removed to expose the bare glass portion 14 of the optical fiber cable. The fiber jacket/buffer layer coating can be stripped using a conventional mechanical fiber stripper. The exposed glass portion can be wiped clean and cleaved to a desired length depending on the type of optical fiber connector being used, using a conventional cleaver. Cleaving provides an end face that can be nearly perpendicular to the axis of the fiber and reduces the amount of polishing required. In some applications, an angle cleave (e.g. of less than about 10°) can be used to improve the performance of the optical fiber connector.

Figure 3B:
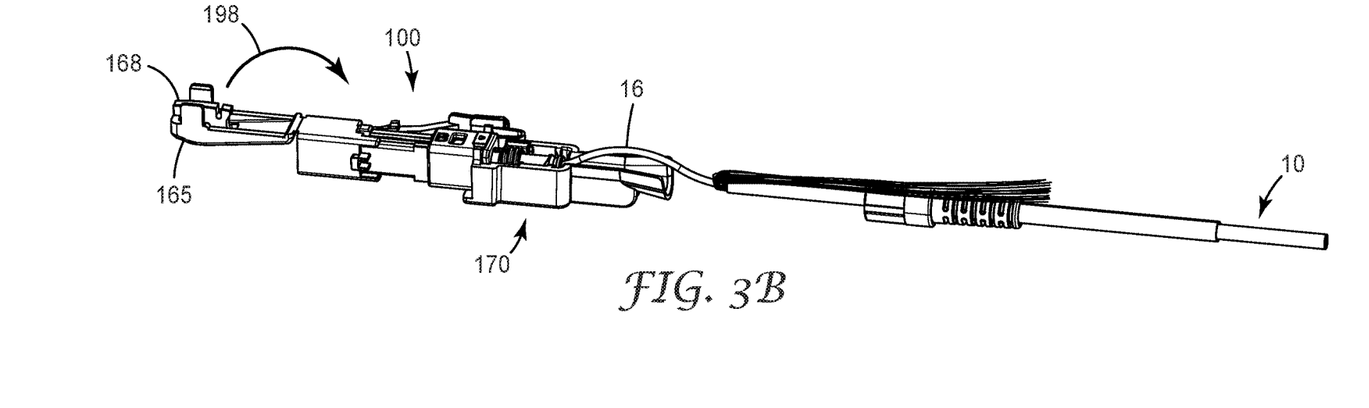
Figure 4A:
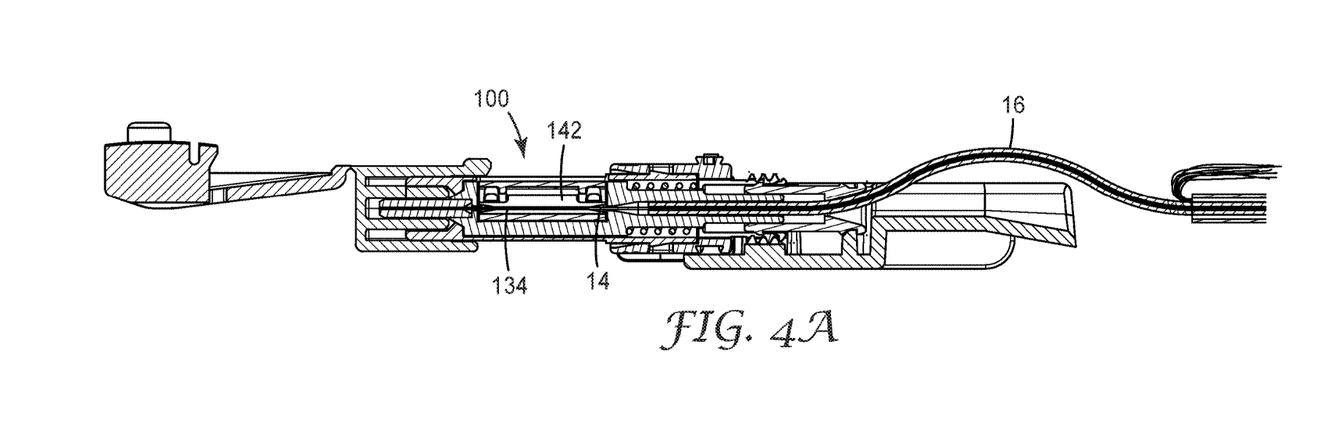
FIG. 4A is a cross-sectional view of the installation step shown in FIG. 3B.

The bare glass portion of optical fiber cable 10 is inserted into the second end of connector 100 using the integrated funnel-shaped fiber guide 170 to facilitate the insertion. The fiber is pushed forward until a portion of the fiber outside of the connector begins to form a fiber bow 16 (FIG. 3B). For a fiber stub connector, the fiber bow will begin to form when terminal end of the bare glass portion 14 of optical fiber contacts the end of the fiber stub within the optical fiber connector. FIG. 4A is a cross section of optical fiber connector 100 of FIG. 3B showing the contacting of the terminal end of the bare glass portion 14 of the optical fiber with the end of the fiber stub within splice element 142.

Figure 3C:
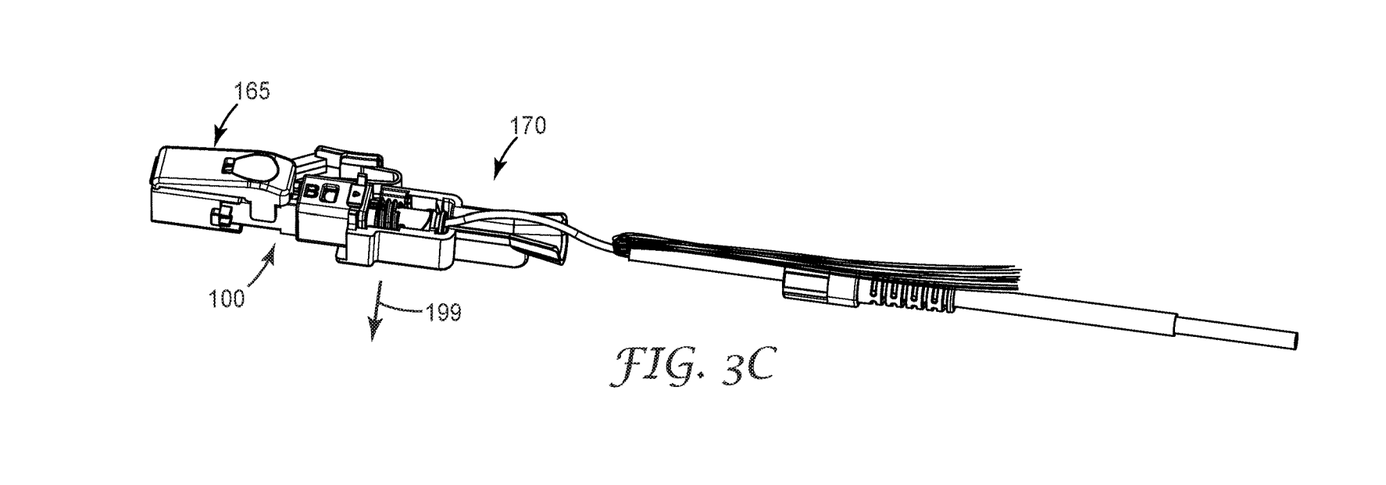

Once a fiber bow 16 has been formed, pressure can be applied to the free end of the cap actuator 165, which is moved as indicated by directional arrow 198 from a first position to a second position. A force concentrator 168 (FIG. 3B) on the bottom side of the actuation lever presses the securing cap over the mechanical element causing it to clamp onto the bare glass portion of the optical fiber extending therethrough. FIG. 3C shows actuator 165 in the second position.

The fiber bow can now be released and the integrated funnel-shaped fiber guide 170 removed from connector backbone 116 by applying a removal force in a direction indicated by directional arrow 199.

Figure 3D:
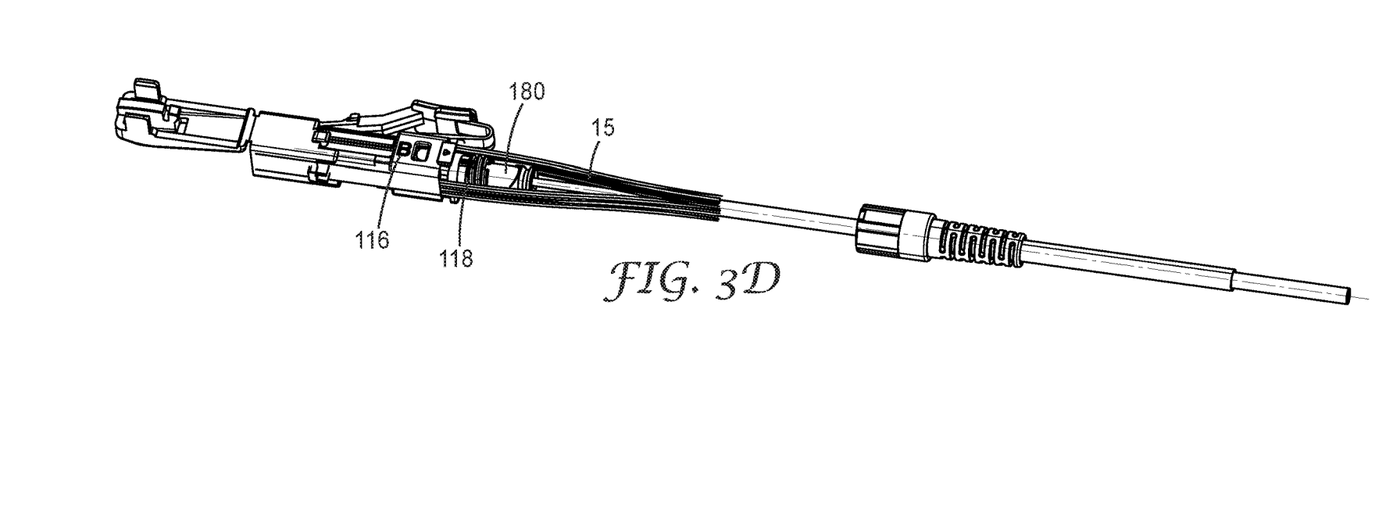
Figure 3E:
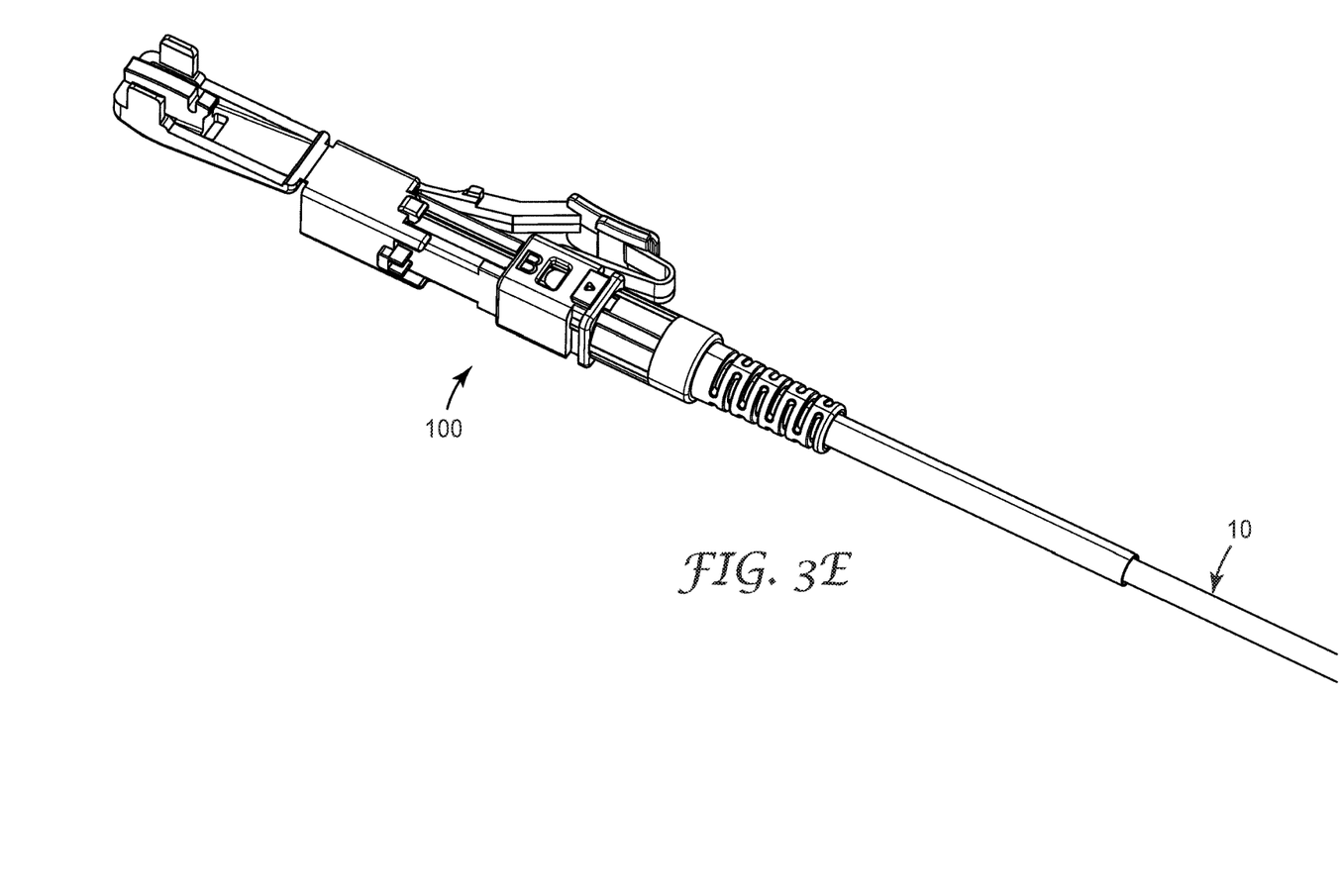
Figure 4B:
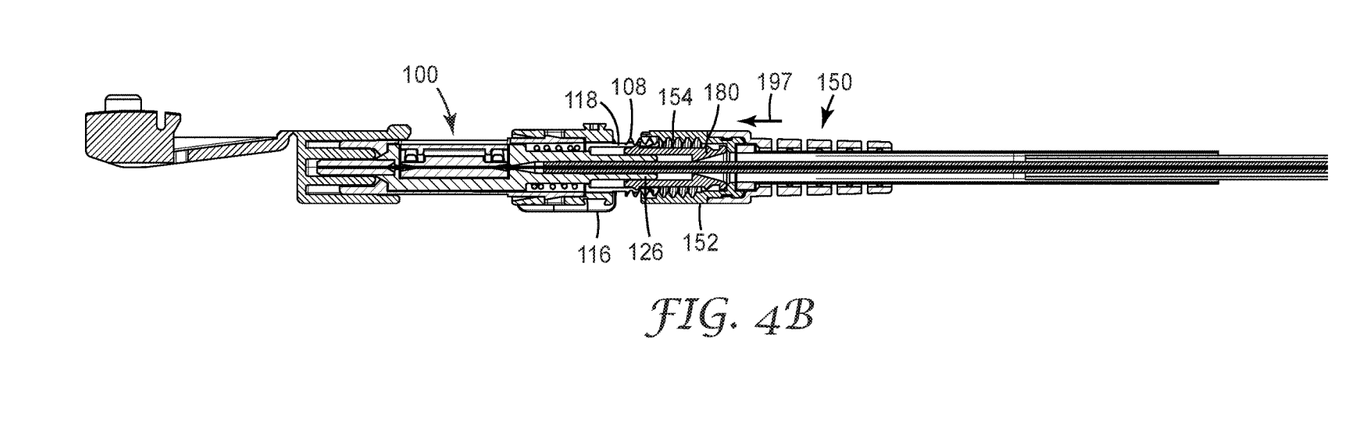
FIG. 4B is a cross-sectional view showing activation of the buffer clamp during the termination of an exemplary optical fiber connector.

The strength members can now be pulled forward over mounting structure 118 of backbone 116 of optical fiber connector 100, as shown in FIG. 3D. Fiber boot 150 can be slid forward until it contacts the second end of backbone 116 so that the inner threads 154 contact the outer threads 108 on mounting structure 118 of the backbone as shown in FIG. 4B. The boot is then screwed onto the mounting structure simultaneously pushing sleeve 180 over the buffer clamping portion 126 as indicated by directional arrow 197, so that the buffer clamping portion bites into and/or squeezes onto the buffer layer of optical fiber cable 10 and trapping the strength members 15 between the fiber boot and the mounting structure. FIG. 3E shows connector 100 mounted onto optical fiber cable 10.

Figure 5A:
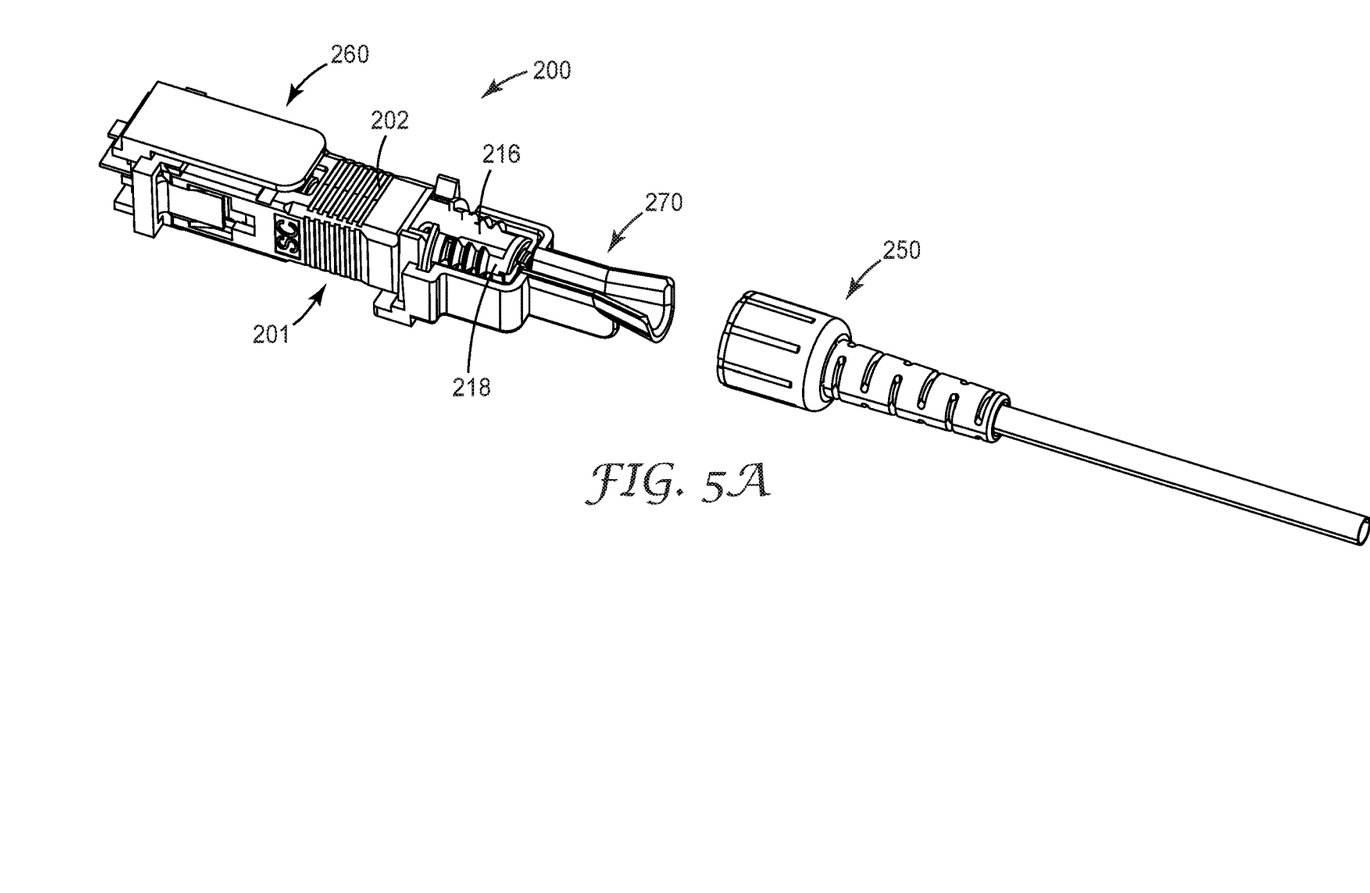
FIGS. 5A-5C are three views of an alternative optical fiber connector with integrated assembly tools according to an embodiment of the present invention.
Figure 5B:
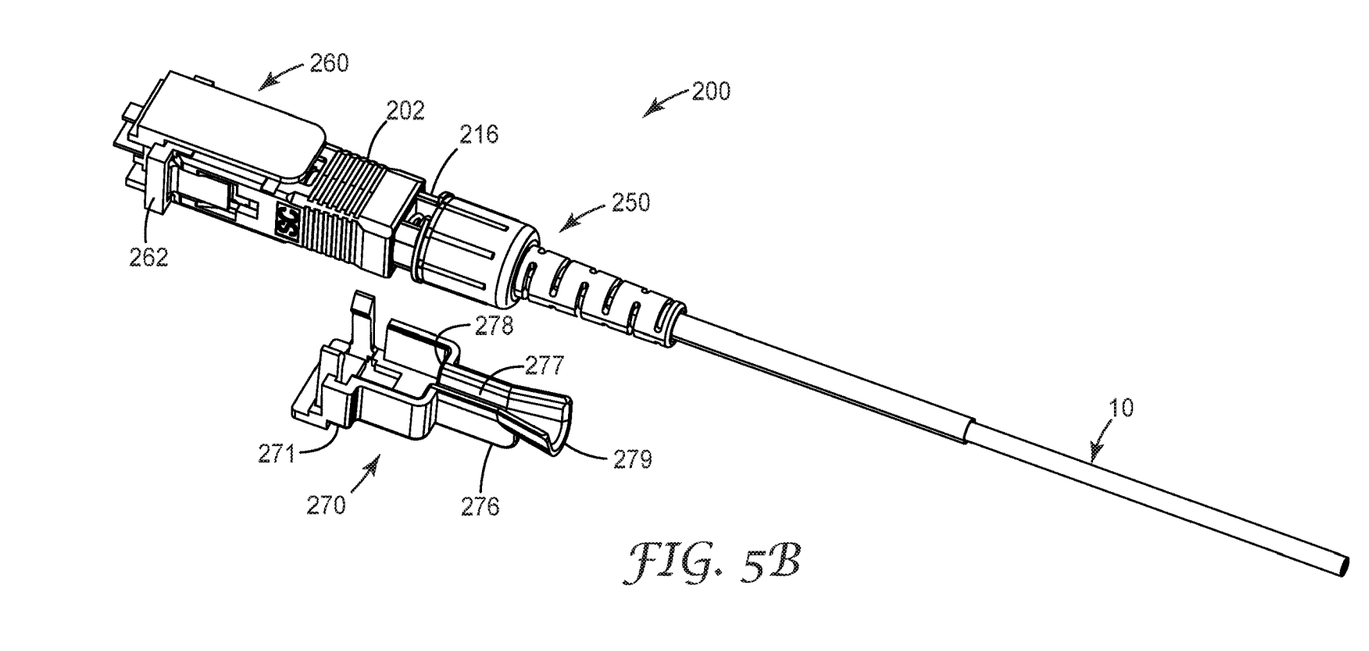
Figure 5C:
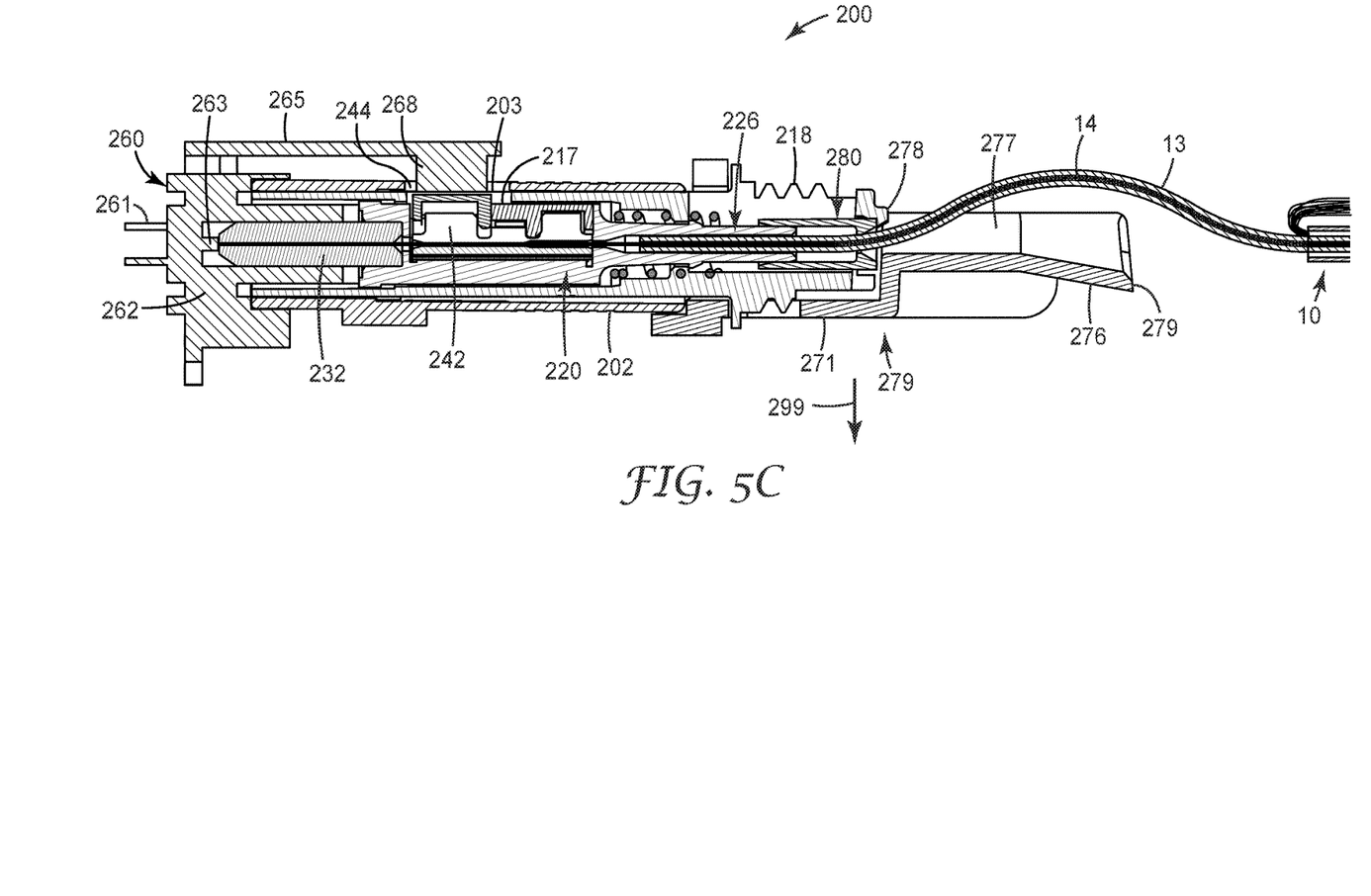

FIGS. 5A-5C show a second mechanical optical fiber connector 200 with removable integrated assembly tools, such as a dust cap actuator tool 260 and a funnel-shaped fiber guide 270. Specifically, optical fiber connector 200 is an SC format optical fiber connector that is used to terminate jacketed optical fiber drop cables.

Optical fiber connector 200 is configured to mate with an SC receptacle. In the exemplary embodiment shown in FIGS. 5A-5C, optical fiber connector 200 is a remote grip SC-format connector, such as is described in U.S. Pat. Nos. 7,280,733, 7,775,726 and 9,389,370, incorporated herein by reference in its entirety.

Optical fiber connector 200 can include a connector housing 201 and a fiber boot 250 to terminate an optical fiber from fiber cable 10. The connector can be supplied with integrated, removable assembly tools such as a dust cap actuator tool 260 and a funnel-shaped fiber guide 270. In this exemplary embodiment, housing 201 includes an outer shell 202 configured to be received in an SC receptacle (e.g., an SC coupling, an SC adapter, or an SC socket). A backbone 216 is housed inside the housing 201 and provides structural support for the connector 200. In addition, the backbone 216 further includes at least one access opening 217, which can provide access to actuate a mechanical fiber gripping mechanism or mechanical splice disposed within the connector, depending on the connector type. In an exemplary aspect, the connector housing can be preassembled with the backbone installed in the outer shell prior to installation onto the terminal end of an optical fiber cable. In this aspect, outer shell 202 includes at least one access opening 203 that is aligned with access opening 217 in the backbone to provide access to the mechanical fiber gripping mechanism or mechanical splice.

When optical connector 200 is a remote grip connector, the terminated optical fiber is not adhesively secured in the connector's ferrule 232 and the mechanical element in the connector is a mechanical gripping element 242. In an alternative aspect of the invention, the optical connector can be a splice type connector having a mechanical splice to splice a field terminated optical fiber to a fiber stub premounted and secured within a fiber ferrule, such as described previously with respect to FIGS. 1-4. Even though the illustrated embodiments of the invention show a remote grip connector, one of ordinary skill in the art given the present description would understand that in an alternative aspect an optical connector can include a mechanical splice device to splice the field fiber to a fiber stub housed in the connector ferrule.

Backbone 216 can further include a mounting section or structure 218 that provides for coupling to the fiber boot 250 to the optical connector 200.

Optical fiber connector 200 also includes a collar body 220 that is disposed within the connector's outer shell and retained therein. A connector ferrule 232 is secured in one end of collar body 220 by any known method (e.g. adhesive, snap fit, etc.). The connector ferrule can be formed from a ceramic, glass, plastic, or metal material to support the optical fiber being inserted and terminated within the optical connector. In a first exemplary aspect, connector ferrule 232 is a ceramic ferrule.

The collar body also houses a mechanical gripping device comprising a mechanical gripping element 242 and an element cap 244 that secures the bare glass portion 14 of the optical fiber cable 10 within the connector and a fiber buffer clamping portion 226 that clamps onto a buffer portion 13 of the optical fiber cable. A sleeve 280 having an opening extending therethrough can be prepositioned partially on the buffer clamping portion in the factory where it is parked until the connector is mounted on the end of an optical fiber cable. During the termination procedure sleeve 280 can be axially slid over the outer surface of buffer clamping portion during installation of the connector onto an optical fiber to activate the buffer clamp.

In a preferred aspect, the gripping element 242 comprises a sheet of ductile material having a focus hinge that couples two legs, where each of the legs includes a fiber gripping channel to optimize clamping forces for a conventional glass optical fiber received therein. The ductile material, for example, can be aluminum or anodized aluminum. Element cap 244 is preferably configured to engage the gripping element 242 such that the gripping element securely grabs a fiber inserted therein when the element cap is fully actuated over the gripping element. In operation, the element cap 244 is moved from an open position to a closed position when pressed down over the gripping element.

Funnel-shaped fiber guide 270 is a removable installation which is integrated with/attached to housing 201 of optical fiber connector 200 in the factory. In an exemplary embodiment, funnel-shaped fiber guide 270 can be similar to funnel-shaped fiber guide 170 shown in FIGS. 1A, 2A and 2B. Providing the optical fiber connector 200 with a dust cap actuator tool 260 and the funnel-shaped fiber guide 270 eliminates the need for a separate assembly platform used with conventional mechanical connectors.

Funnel-shaped fiber guide 270 includes a connection portion 271 that enables fiber guide to be removably connected to the backbone 216 of optical fiber connector 200 as shown in FIGS. 5A and 5C and a funnel portion 276 to facilitate insertion of the optical fiber into the collar body 220 of the connector. The connection portion 271 comprises a box-like cradle that can partially surround and hold the second end of an optical fiber connector. After the optical fiber has been secured in the optical fiber connector, the funnel-shaped fiber guide can be removed from the connector by applying a removal force as indicated by directional arrow 299 in FIG. 5C. The funnel portion 276 of the funnel-shaped fiber guide 270 includes a channel 277 extending from a first or narrow end 278 adjacent the connection portion to a second or wide end 279 spaced away from the connection portion. The channel is tapered between the wide end and the narrow end. The funnel portion facilitates insertion of the bare glass portion of the optical fiber into the second end of the connector while the connection portion ensures alignment of the narrow end of the funnel portion with the second end of the connector.

Dust cap actuator tool 260 comprises a body portion 262 that covers the end face of the connector ferrule 232 and a cap actuator or driver 265 that is configured as a lever to contact and press against the element cap of the connector, such as element cap 244 of the mechanical element when acted on by an installer. Cap actuator 265 can be connected body portion 262 at one end and to form a cantilever structure that extends over the connector so that the position force concentrator 268 is positioned over element cap 244 so that it can actuate the mechanical splice in the optical fiber connector when the cap actuator is depressed.

In this exemplary aspect, a small chamber is formed in the end body portion 262 of the dust cap actuator tool 260 and has an inner diameter slightly larger than the outer diameter of the ferrule 232. At the end of the cavity, there is a protrusion setting post 263. The exposed face of the protrusion setting post can be disposed perpendicular to the fiber axis or can be offset by at a slight angle face from perpendicular. In an exemplary aspect, the end face of the protrusion setting post can have a small depression to control the length of optical fiber that protrudes from the end face of the connector ferrule when terminating an optical fiber connector with a remote grip style of connector.

During the termination process, the bare glass portion of the optical fiber is inserted through the ferrule until it contacts the end of the protrusion setting post at which time the fiber will begin to bow as shown in FIG. 5C. The cap actuator 265 is pressed toward the connector to actuate the mechanical gripping element 242 to secure the bare glass portion of the optical fiber in connector 200. The bow is then released and the funnel-shaped fiber guide removed. The boot can then be attached to the second end of the connector which causes sleeve 280 to be pushed forward to actuate the buffer clamping portion of the connector.

Dust cap actuator tool 260 can also include protruding or extending pin structures 261 that can be used to displace the element cap 244 of the splice device when needed for fiber repositioning or removal within splice element 242.

The integrated tools of the present invention facilitate termination of optical fiber connectors on the end of an optical fiber cable by reducing the number of auxiliary tools required. Having the tools integrated with the optical fiber connectors in the factory can reduce installation errors due to the use of incorrect tools.

Various modifications, equivalent processes, as well as numerous structures to which the present invention may be applicable will be readily apparent to those of skill in the art to which the present invention is directed upon review of the present specification.

We claim:

1. An optical fiber connector having at least one removable integrated assembly tool for terminating an optical fiber cable, comprising:
   a housing configured to mate with a receptacle;
   a collar body disposed in the housing, the collar body securing a ferrule at a first end thereof, a mechanical element disposed in an intermediate second portion of the collar body, and a buffer clamping portion near a second end of the collar body, wherein the buffer clamping portion is configured to clamp at least a portion of a buffer cladding of an optical fiber upon actuation;
   a backbone to retain the collar body within the housing, the backbone including a mounting structure surrounding a central bore at one end of the backbone; and
   a dust cap actuator tool disposed over the ferrule, wherein the dust cap actuator tool comprises (i) a body portion that covers and protects an end face of the ferrule and (ii) a cap actuator that is configured to actuate the mechanical element in the connector.

2. The connector of claim 1, wherein the cap actuator is connected to the body portion by a living hinge so that the cap actuator can be moved from a first position to a second position.

3. The connector of claim 1, wherein the mechanical element is a mechanical fiber gripping element.

4. The connector of claim 1, further comprising a fiber stub adhesively mounted in the ferrule wherein a first end of the fiber stub is disposed flush with the end face of the ferrule and a second end of the fiber stub extends beyond the ferrule so that it will extend into an interior of the connector.

5. The connector of claim 4, wherein the second end of the fiber stub extends into the mechanical element where it will be spliced to a terminal end of the optical fiber cable.

6. The connector of claim 4, wherein the mechanical element is a mechanical splice element.

7. The connector of claim 1, wherein the connector comprises an LC format connector or an SC format connector.

8. The connector of claim 1, further comprising:
   a removable funnel-shaped fiber guide attached to the mounting structure to facilitate insertion of an optical fiber into the connector; and
   a fiber boot attachable to the mounting structure after the funnel-shaped fiber guide has been removed.

9. The connector of claim 8, wherein the funnel-shaped fiber guide includes a connection portion to removably connect and align the funnel-shaped fiber guide to the backbone of optical fiber connector and a funnel portion to facilitate insertion of the optical fiber into the collar body of the connector.

10. The connector of claim 9, wherein the connection portion comprises a box-like cradle that partially surrounds the mounting structure and a pair of catch arms to secure the funnel-shaped fiber guide to the mounting structure.

11. The connector of claim 10, wherein the pair of catch arms comprises a stationary catch arm and a flexible catch arm.

12. A removable funnel-shaped fiber guide that can be temporarily attached to an optical fiber connector to facilitate insertion of an optical fiber into the optical fiber connector, the funnel-shaped fiber guide comprising:
   a connection portion to removably connect and align the funnel-shaped fiber guide to the optical fiber connector, wherein the connection portion comprises a pair of catch arms to secure the funnel-shaped fiber guide to the optical fiber connector; and
   a funnel portion to facilitate insertion of the optical fiber into a collar body of the connector, wherein the funnel portion of the funnel-shaped fiber guide includes a channel extending from a narrow end adjacent the connection portion to a wide end spaced away from the connection portion.

13. The funnel-shaped fiber guide of claim 12, wherein the pair of catch arms comprises a stationary catch arm and a flexible catch arm.

14. The funnel-shaped fiber guide of claim 12, wherein the connection portion includes one or more alignment walls to help maintain alignment of the funnel portion of the funnel-shaped fiber guide with a second end of the optical fiber connector.

15. The funnel-shaped fiber guide of claim 12, wherein the channel is tapered from the wide end and the narrow end.

16. An optical fiber connector having at least one removable integrated assembly tool for terminating an optical fiber cable, comprising:
   a housing configured to mate with a receptacle;
   a collar body disposed in the housing, the collar body securing a ferrule at a first end thereof, a mechanical element disposed in an intermediate second portion of the collar body, and a buffer clamping portion near a second end of the collar body, wherein the buffer clamping portion is configured to clamp at least a portion of a buffer cladding of an optical fiber upon actuation;
   a backbone to retain the collar body within the housing, the backbone including a mounting structure surrounding a central bore at one end of the backbone;
   a removable funnel-shaped fiber guide attached to the mounting structure to facilitate insertion of an optical fiber into the optical fiber connector, wherein the funnel-shaped fiber guide includes (A) a funnel portion to facilitate insertion of the optical fiber into the collar body of the connector, and (B) a connection portion to removably connect and align the funnel-shaped fiber guide to the backbone of the optical fiber connector, and wherein the connection portion comprises (i) a box-like cradle that partially surrounds the mounting structure and (ii) a pair of catch arms to secure the funnel-shaped fiber guide to the mounting structure; and
   a fiber boot attachable to the mounting structure after the funnel-shaped fiber guide has been removed.

17. The connector of claim 16, wherein the connection portion includes one or more alignment walls to help maintain alignment of the funnel portion of the funnel-shaped fiber guide with the second end of the optical fiber connector.

18. The connector of claim 16, wherein the funnel portion of the funnel-shaped fiber guide includes a channel extending from a narrow end adjacent the connection portion to a wide end spaced away from the connection portion.

19. The connector of claim 18, wherein the channel is tapered from the wide end and the narrow end.

20. The connector of claim 16, wherein the pair of catch arms comprises a stationary catch arm and a flexible catch arm.

* * * * *